Nov. 17, 1942.                G. B. STILLWAGON, JR                2,302,272
                                  UNIVERSAL JOINT
                                Filed Aug. 25, 1941
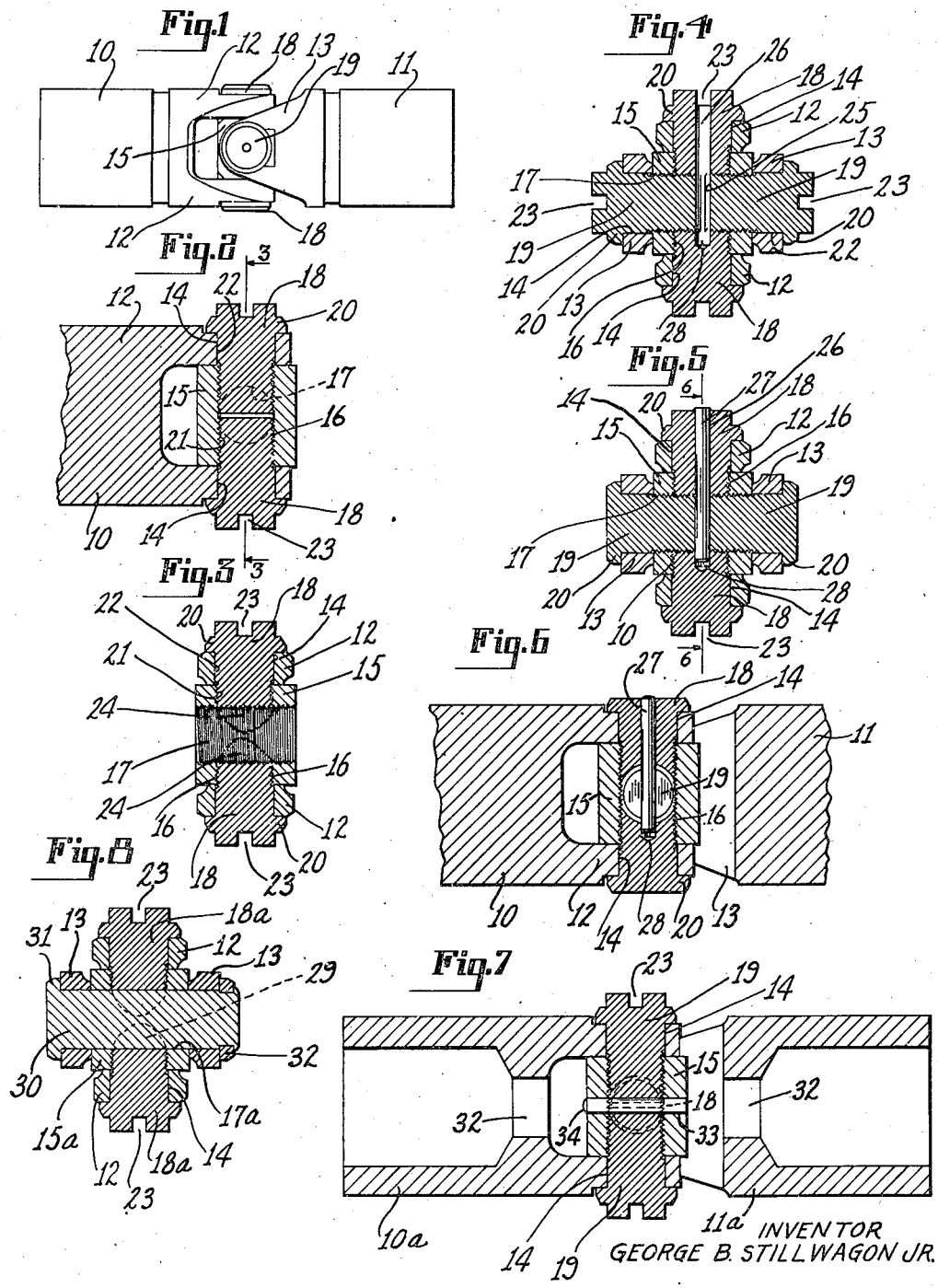
INVENTOR
GEORGE B. STILLWAGON JR.
BY
ATTORNEY Patented Nov. 17, 1942

2,302,272

UNITED STATES PATENT OFFICE 2,302,272

UNIVERSAL JOINT

George B. Stillwagon, Jr., Dayton, Ohio, assignor of one-half to Kenneth G. Fraser, Dayton, Ohio Application August 25, 1941, Serial No. 408,155

8 Claims. (Cl. 64—17)

This invention relates to a universal joint and the method of assembling the same and locking the pivot pins against displacement. The invention is designed primarily for use in aircraft and other installations where the joint must be capable of withstanding severe strains, and the pivot pins must be of such a character and so locked that they will not be displaced or distorted when subjected to such strains over long periods of use; and is intended to and does meet the requirements of the present specifications of the United State Army Air Corps for universal joints.

It has been proposed heretofore to provide a universal joint of this general type with pivot pins which were screwed into the connecting block, but such joints have not been entirely satisfactory for various reasons, such as the lack of the necessary strength and the difficulty and expense of producing and assembling the various parts of the joint, and particularly the pivot pins and the means for locking the same.

One object of the invention is to produce a strong durable universal joint of simple construction.

A further object of the invention is to produce a universal joint in which screw threaded pivot pins are positively locked against displacement.

A further object of the invention is to produce such a universal joint comprising a small number of parts of such a character that they may be easily manufactured and assembled at a relatively low cost.

Other objects of the invention may appear as the invention is described in detail.

In the accompanying drawing Fig. 1 is a top plan view of a universal joint embodying my invention; Fig. 2 is a section taken centrally through a partly assembled joint, illustrating the first step in the assembling thereof; Fig. 3 is a sectional view taken on the line 3—3 of Fig. 2, showing the second step in assembling the joint; Fig. 4 is a sectional view also taken on the line 3—3 of Fig. 2, showing the third step in the assembling of the joint; Fig. 5 is a similar section showing the fourth step in the assembling of the joint; Fig. 6 is a sectional view taken on the line 6—6 of Fig. 5, showing a completed joint with the coupling members partly broken away; Fig. 7 is a longitudinal section taken centrally through a slightly modified form of joint; and Fig. 8 is a transverse sectional view taken through a modified form of joint on a line corresponding to the line 3—3 of Fig. 2.

In the drawing I have illustrated the preferred form of my universal joint, together with a modification thereof, and the preferred method of assembling the joint and locking the pivot pins against displacement, but it is to be understood that this construction and method are shown for the purpose of illustration only and that the joint may take various forms and may be assembled in various ways without departing from the spirit of the invention.

In the preferred form of the invention, as shown in Figs. 1 to 6, the joint comprises two coupling members 10 and 11, arranged end to end and each member is provided with a pair of jaws, 12 and 13, in planes intersecting the planes of the jaws of the other member, and each jaw has an opening 14 forming a bearing. A connecting member 15 is located between the jaws of both pairs of jaws and is provided with intersecting screw threaded bores 16 and 17 which are alined with the bearing openings 14 of the respective pairs of jaws. The jaws of the two pairs of jaws are connected with the connecting block 15 by two pairs of pivot pins, 18 and 19, the pins 18 extending through the jaws 12 and the pins 19 extending through the jaws 13. Each pin has an outer head 20 to engage the outer side of the corresponding jaw, a screw threaded inner portion 21 to enter the adjacent end of the corresponding screw threaded bore in the connecting block, and an intermediate smooth portion 22 to enter the bearing opening in its jaw. The head 20 of each pin has means, such as a kerf 23, for rotating the pin to screw the same into the connecting block and this rotating means is preferably provided in an outwardly extending portion of the pin head.

In assembling the joint the connecting block 15 is inserted between the jaws of one pair of jaws, in the present instance the jaws 12, and with one screw threaded bore, 16, in line with the bearing openings 14 of the jaws 12. The pivot pins of one pair, in the present instance the pair 18, are then inserted through the bearing openings 14 in the respective jaws and screwed into the adjacent ends of the screw threaded bore in the connecting block. These pins are of such length that when the heads 20 thereof are brought into substantial engagement with the outer sides of the respective jaws the inner end portions of the pins will extend into the other or intersecting bore 17 of the connecting block and the ends thereof will be arranged adjacent the axis of said intersecting bore. The adjacent ends of the pins 18 may be brought into contact one with the other but it is preferable that they should be spaced a short distance apart to permit of the adjustment of the pins. After the pins 18 have been so inserted, as shown in Fig. 2, the end portions thereof which extend into the intersecting bore 17 are bored transversely to provide the inner ends thereof with opposed transverse recesses, as shown at 24 in Fig. 3. This boring may be conveniently accomplished by inserting a drill through the bore 17, the pins being held against rotation in any suitable manner, as by means of a suitable fixture. The recesses 24 are then tapped to provide the same with screw threads corresponding with the screw threads of the bore 17, the screw threaded recesses being preferably described on radii of a length equal to the radii of the bore 17, so that the screw threaded walls of the recesses and the screw threaded bore 17 constitute a continuous threaded passageway. The inner ends of pins 18 may be recessed and threaded before they are inserted in the block but when this is done difficulty is experienced in properly alining the recesses with the intersecting bore 17, and this difficulty is avoided by boring and threading the pins after they have been inserted in the block.

After the recesses 24 in the pins 18 have been tapped the jaws 13 of the other coupling member are placed in position on the connecting block and the second pair of pins, 19, are inserted through the bearing openings of the jaws 13 and screwed into the respective end portions of the bore 17 and into the screw threaded recesses in the inner ends of the pins 18, thereby positively locking the pins 18 against movement in any direction with relation to the block. Preferably the inner ends of the pins 19 extend close to the axis of the bore 16 but are spaced one from the other. The inner ends of the pins 19 are provided with opposed transverse recesses 25, as shown in Fig. 4, preferably by boring the same after they have been inserted in the bore 17. One of the pins 18 is provided with an axial opening 26 which is in line with the opposed recesses 25 in the pins 19 and a locking pin 27 is driven through the opening in the pin 18 and the opposed recesses in the pins 19 to rigidly lock the pins 19 against displacement, as shown in Fig. 5. The opening 26 in the pin 18 may be formed in the pin at any time but it is preferably formed by the same boring operation which forms the opposed recesses in the inner ends of the pins 19. It is also preferable that the second pin 18 should be provided with an axial bore in line with the axial bore 26 to receive the end of the pin 27 and support the latter firmly against any distortion due to turning stresses on the pins 19. The opening in the second pin 18 may, if desired, extend entirely through that pin but it is only necessary that it should extend far enough to receive a substantial portion of the locking pin 27, as shown at 28 in Figs. 4 and 5.

The pins of both pairs of coupling members are thus positively locked against displacement, and the pivot pins are provided with additional strength due to the fact that they have screw threads extending substantially to the transverse centers of their respective bores. It is not essential that the transverse recesses in the pivot pins 18 should be threaded or that they should be on the same radii as the bore 17 in the connecting block. They can be described on shorter radii and the inner ends of the pivot pins 19 may be reduced in diameter to enter these smaller recesses, and these reduced portions of the pivot pins 19 may be either threaded or smooth, depending upon whether or not the recesses in the pins 18 are threaded or unthreaded. Further, it is not essential that the opening 26 for the locking pin 27 should be formed in one of the pins 18 but it may be formed in another part of the structure which is fixed with relation to the pivot pins 19. For example, in the joint shown in Fig. 7 the coupling members 10a and 11a are hollow and are provided with openings or bores 32 extending through the inner ends thereof in line with the connecting block 15. By inserting a drill through the opening 32 in one of the coupling members the connecting block 15 may be bored transversely to the pivot pins, as shown at 33, the bore extending through the inner ends of the pivot pins 19, and the locking pin 34 may then be inserted in the bore in the connecting block and in the recesses in the inner ends of the pivot pins 19.

When the joint has been completely assembled as above described, and as shown in Fig. 6, it is preferable that those portions of the pin heads in which the kerfs are formed shall be removed, as by grinding, so as to make it very difficult, if not impossible, to disassemble the joint after the pivot pins have been inserted and locked, thereby preventing tampering with the joint.

While I prefer that all the pivot pins should be screw threaded into the respective bores of the connecting block this is not essential and I have shown in Fig. 8 a form of joint in which a part only of the pins are screw threaded. As there shown the pivot pins 18a are screwed into threaded bores in a connecting block 15a and those ends of the pins which extend into the intersecting bore 17a are bored to provide the inner ends of the pins with transverse recesses, as shown at 29, but these recesses are not screw threaded. When the pins 18a have been inserted and bored the second coupling member is placed in position on the coupling block and a single pin 30 is inserted through the intersecting bore 17 and the transverse recesses 29 in the pins 18a and the jaws of said coupling member. The pin 30 is provided at one end with a head 31 and after it has been inserted as described a washer 32 is placed about the other end portion thereof and that part of the pin which extends beyond the washer is upset or riveted to secure the washer thereto and thus positively prevent the longitudinal displacement of the pin 30.

While I have shown and described two embodiments of my invention I wish it to be understood that I do not desire to be limited to the details thereof as various modifications may occur to a person skilled in the art.

Having now fully described my invention, what I claim as new and desire to secure by Letters Patent, is:

1. In a universal joint, two coupling members arranged end to end and each having at one end a pair of jaws in planes intersecting the planes of the jaws of the other member, the jaws of each pair of jaws having alined bearing openings, a connecting block mounted between the jaws of both members and having intersecting bores in line with the openings in the jaws of the respective members, at least one of said bores being provided with screw threads, screw threaded pivot pins extending through the jaws of one pair of jaws, screwed into the respective end portions of the screw threaded bore of said block and having their inner ends located adjacent an axial plane extending through the other bore transversely to the pins in said screw threaded bore and the adjacent ends of said pins having opposed transverse recesses in line with the last mentioned bore, pivot pins extending through the jaws of the other of said members and through the respective end portions of said last mentioned bore, at least one of the last mentioned pins extending into said transverse recesses in the first mentioned pins to lock the latter against displacement, and means for locking said last mentioned pins against axial displacement.

2. In a universal joint, two coupling members arranged end to end and each having at one end a pair of jaws in planes intersecting the planes of the jaws of the other member, the jaws of each pair of jaws having alined bearing openings, a connecting block mounted between the jaws of both members and having intersecting screw threaded bores in line with the openings in the jaws of the respective members, separate pivot pins extending through the openings in the respective jaws and screwed into the respective end portions of the corresponding threaded bores in said block, the pins in one of said bores having their inner ends located adjacent an axial plane extending through the other bore transversely to the pins in the first mentioned bore, said inner ends of the pins in said first mentioned bore having transverse recesses in line with the last mentioned bore, the pins in the last mentioned bore extending into recesses in the ends of the first mentioned pins to lock the latter against rotation, and means to lock the last mentioned pins against rotation.

3. In a universal joint, two coupling members arranged end to end and each having at one end a pair of jaws in planes intersecting the planes of the jaws of the other member, the jaws of each pair of jaws having alined bearing openings, a connecting block mounted between the jaws of both members and having intersecting screw threaded bores in line with the openings in the jaws of the respective members, separate pivot pins extending through the openings in the respective jaws and screwed into the respective end portions of the corresponding threaded bores in said block, the pins in one of said bores having their inner ends located adjacent an axial plane extending through the other bore transversely to the pins in the first mentioned bore, said inner ends of the pins in said first mentioned bore having transverse recesses in line with the last mentioned bore, the pins in the last mentioned bore extending into the recesses in the ends of the first mentioned pins to lock the latter against rotation, the adjacent ends of the last mentioned pins having opposed transverse recesses, and a locking element extending through a part of said joint which is fixed with relation to the last mentioned pins and into the recesses in said last mentioned pins to lock the latter against rotation.

4. In a universal joint, two coupling members arranged end to end and each having at one end a pair of jaws in planes intersecting the planes of the jaws of the other member, the jaws of each pair of jaws having alined bearing openings, a connecting block mounted between the jaws of both members and having intersecting screw threaded bores in line with the openings in the jaws of the respective members, separate pivot pins extending through the openings in the respective jaws and screwed into the respective end portions of the corresponding threaded bores in said block, the pins in one of said bores having their inner ends located adjacent an axial plane extending through the other bore transversely to the pins in the first mentioned bore, said inner ends of the pins in said first mentioned bore having transverse recesses in line with the last mentioned bore, said recesses being provided with screw threads, the pins in the last mentioned bore being screwed into the transverse recesses of the first mentioned pins to lock the latter against rotation, the adjacent ends of the last mentioned pins having opposed transverse recesses, and a locking pin in the transverse recesses of the last mentioned pins to lock the latter against rotation.

5. In a universal joint, two coupling members arranged end to end and each having at one end a pair of jaws in planes intersecting the planes of the jaws of the other member, the jaws of each pair of jaws having alined bearing openings, a connecting block mounted between the jaws of both members and having intersecting screw threaded bores in line with the openings in the jaws of the respective members, separate pivot pins extending through the openings in the respective jaws and screwed into the respective end portions of the corresponding threaded bores in said block, the pins in one of said bores having their inner ends located adjacent an axial plane extending through the other bore transversely to the pins in the first mentioned bore, said inner ends of the pins in said first mentioned bore having transverse recesses in line with the last mentioned bore, said recesses being provided with screw threads, the pins in the last mentioned bore being screwed into the transverse recesses of the first mentioned pins to lock the latter against rotation, the adjacent ends of the last mentioned pins having opposed transverse recesses, one of the first mentioned pins having an axial opening therethrough in line with the recesses in said last mentioned pins, and a locking pin extending through said axial opening and into the recesses in said last mentioned pins.

6. In a universal joint, two coupling members arranged end to end and each having at one end a pair of jaws in planes intersecting the planes of the jaws of the other member, the jaws of each pair of jaws having alined bearing openings, a connecting block mounted between the jaws of both members and having intersecting screw threaded bores in line with the openings in the jaws of the respective members, separate pivot pins extending through the openings in the respective jaws and screwed into the respective end portions of the corresponding threaded bores in said block, the pins on one of said bores having their inner ends located adjacent an axial plane extending through the other bore transversely to the pins in the first mentioned bore, said inner ends of the pins in said first mentioned bore having transverse recesses in line with the last mentioned bore, said recesses being provided with screw threads, the pins in the last mentioned bore being screwed into the transverse recesses of the first mentioned pins to lock the latter against rotation, the adjacent ends of the last mentioned pins having opposed transverse recesses, said first mentioned pins having longitudinal openings in line with the recesses in the last mentioned pins, at least one of said openings extending for the full length of said pin, and a locking pin extending through said openings in said first mentioned pins and into the recesses in said last mentioned pins.

7. In a universal joint, two coupling members arranged end to end and each having at one end a pair of jaws in planes intersecting the planes of the jaws of the other member, the jaws of each pair of jaws having alined bearing openings, a connecting block mounted between the jaws of both members and having intersecting bores in line with the openings in the jaws of the respective members, at least one of said bores being provided with screw threads, screw threaded pivot pins extending through the jaws of one pair of jaws, screwed into the respective end portions of the screw threaded bore of said block and having their inner ends located adjacent an axial plane extending through the other bore transversely to the pins in said screw threaded bore and the adjacent ends of said pins having opposed transverse recesses in line with the last mentioned bore, pivotal connecting means mounted in said last mentioned bore, extending through the jaws of the other of said members and having a part located in the opposed recesses in said pins to lock the latter against rotation, and means to lock said connecting means against axial displacement.

8. In a universal joint, two coupling members arranged end to end and each having at one end a pair of jaws in planes intersecting the planes of the jaws of the other member, the jaws of each pair of jaws having alined bearing openings, a connecting block mounted between the jaws of both members and having intersecting bores in line with the openings in the jaws of the respective members, at least one of said bores being provided with screw threads, screw threaded pivot pins extending through the jaws of one pair of jaws, screwed into the respective end portions of the screw threaded bore of said block and having their inner ends located adjacent an axial plane extending through the other bore transversely to the pins in said screw threaded bore and the adjacent ends of said pins having opposed transverse recesses in line with the last mentioned bore, a pivot pin extending through said last mentioned bore, through the opposed recesses in the first mentioned pins and through both jaws of the other of said members, and means for locking said last mentioned pin against axial displacement.

GEORGE B. STILLWAGON, JR.